United States Patent [19]

Austin et al.

[11] Patent Number: 4,891,086
[45] Date of Patent: Jan. 2, 1990

[54] STRAND COATING METHOD

[75] Inventors: Thomas H. Austin, Austin; Dudley J. Primeaux, II, Elgin, both of Tex.

[73] Assignee: Texaco Inc., White Plains, N.Y.

[21] Appl. No.: 252,214

[22] Filed: Oct. 3, 1988

Related U.S. Application Data

[63] Continuation of Ser. No. 39,035, Apr. 16, 1987, abandoned.

[51] Int. Cl.$^4$ .............................................. B32B 31/00
[52] U.S. Cl. .................................. 156/296; 156/166; 156/181; 156/305; 156/331.4; 174/72 A; 174/117 R; 427/117; 427/421; 427/426; 428/378; 428/379; 428/383; 525/409; 528/68
[58] Field of Search ............... 156/296, 166, 305, 181, 156/331.4; 427/117, 421, 120, 426, 388.1, 388.4, 388.5; 428/378, 383, 379; 525/469; 528/68; 174/72 A, 117 R, 117 A

[56] References Cited

U.S. PATENT DOCUMENTS

| | | | |
|---|---|---|---|
| 3,979,364 | 9/1976 | Rowton | 528/55 |
| 4,368,232 | 1/1983 | Morioka et al | 156/181 |
| 4,497,849 | 2/1985 | Hughes et al. | 427/120 |

Primary Examiner—John J. Gallagher
Attorney, Agent, or Firm—Jack H. Park; Kenneth R. Priem

[57] ABSTRACT

A process for polymer coating of narrow strands, for example, wires with a polymer, is disclosed whereby a rapidly reacting polymer formulation is sprayed onto the narrow strands whereupon it hardens in a very short period of time and another layer of strands is then placed atop the first which have now been coated with the polymer and a second layer of polymer formulation is sprayed on these strands, etc. The polymer formulation used comprises amine terminated polyethers of greater than 1500 average molecular weight, having greater than 50% of their average hydrogens in the form of amine hydrogens, a chain extender and an aromatic polyisocyanate.

3 Claims, No Drawings

STRAND COATING METHOD

This is a continuation of Ser. No. 039,035, filed 4/16/87, now abandoned.

BACKGROUND OF THE INVENTION

1. Field of the Invention

This invention concerns the field of coating strands, for example, wires with a polymer.

2. Description of Related Publications

Methods for coating strands (e.g. wires) includes several methods, including the use of extrusion or coextrusion techniques. In the extrusion technique, a tube is made for the wire to be coated through which the wire can later be slipped. In coextrusion, a urethane material, for example, is applied directly to the wire being covered. Both of these methods involve the use of heat to melt the polymer and high pressure to push the rather highly viscous material out of the extrusion orifice. These processes have limitations in that the thickness of the urethane coating being applied must be relatively great to achieve uniformity and a smooth defect-free finish. Therefore, such techniques are not very useful when one wants to apply a coating only a few one-thousandths of an inch thick since close tolerance between orifice and wire diameters is required.

Urethanes are also adaptable to vacuum and injection molding systems. Again, like extrusion, high temperature melting is required and the adaptability of such techniques for small wire coating is severely limited.

Another technique called "lacquering" is used for coating wire or other materials. In this technique, the urethane is dissolved in a volatile solvent and then the resultant solution is sprayed on the object to be coated. Alternately, the object is dipped into the solution for coating much as one would make candles. The solvent is then evaporated at temperatures up to 200° C. leaving an adherent film of urethane to harden on the surface. This latter technique is disadvantaged since the process is slow and provides only limited production possibilities. In addition, because the urethane lacquers are quite thin when applied, they tend to run off or sag on the surface to be covered.

U.S. Pat. No. 4,497,849 describes such techniques and suggests improvements.

U.S. Pat. Nos. 4,396,729; 4,444,910 and 4,433,067 concern elastomers prepared using a high molecular weight amine terminated polyether, an aromatic diamine chain extender and an aromatic polyisocyanate which may merely be a polyisocyanate or a quasi-prepolymer prepared from a polyol reacted with a polyisocyanate wherein some isocyanate groups are still left unreacted. Various patents have been applied for and received using the basic combination recited above as well as various mold release agents and other additives, for example, catalysts.

European Pat. Application No. 81,701A concerns reaction injection molded elastomers where fatty acid salts are recommended internal mold release agents. The corresponding U.S. application Ser. No. 443,444, filed 11/2282, is the subject of interference proceedings with the '729, '910 and '067 patents referred to above (Interference Nos. 101,393; 101,394; and 101,395).

U.S. Pat. No. 4,585,850 concerns and claims a reaction injection molded elastomer made by reacting in a closed mold amine terminated polyethers of greater than 1500 average molecular weight, having greater than 50% of their active hydrogens in the form of amine hydrogens, a chain extender, flaked glass pretreated with amino silane coupling agent, and an aromatic polyisocyanate. The '850 patent referred to above contains a discussion of other applications and patents in the field; for example, U.S. Pat. No. 4,474,900 and U.S. Pat. No. 4,507,090, and is incorporated herein by reference.

European Pat. Application No. 81,701A concerns reaction injection molded elastomers where fatty acid salts are recommended internal mold release agents. The corresponding U.S. application Ser. No. 443,444, filed 11/22/82, is the subject of interference proceedings with the '729, '910 and '067 patents referred to above (Interference Nos. 101,393; 101,394; and 101,395)

The paper "Silane Effects and Machine Processing in Reinforced High Modulus RIM urethane Composites," by E. G. Schwartz, et al., *Journal of Elastomers and Plastics*, vol. 11 (Oct. 1979), page 280, describes the use of silane treated milled glass fibers in reinforced RIM composites.

The article "Surface Modification for RRIM Urethanes," by Ed Galli, *Plastics Compounding* (Jan/Feb 1982) discloses silane treated glass fiber reinforcement of RRIM urethanes. The emphasis is on amino silanes.

By use of the formulations disclosed in the above patents, for example U.S. Pat. No. 4,433,067, a rapid way to coat strands of various materials is provided. Unlike the citations in the '850 patent above and the journal articles referred to above, the present invention describes a method for coating strands of various materials whereas those references discuss the use of filler materials, for example, glass fibers in the formulation. The present invention describes a method for coating strands of various materials by spraying onto the strands a formulation similar to that described in U.S. Pat. No. 4,433,067 and claimed hereinafter.

SUMMARY OF THE INVENTION

The invention is a method for coating strands which comprises spraying onto the strands a formulation comprising amine terminated polyethers of greater than 1500 molecular weight, having greater than 50% of their active hydrogens in the form of amine hydrogens, a chain extender and an aromatic polyisocyanate.

DESCRIPTION OF THE PREFERRED EMBODIMENTS

Amine terminated polyethers including primary and secondary amine terminated polyether polyols of greater than 1500 average molecular weight having from 2 to 6 functionality, preferably from 2 to 3, and an amine equivalent weight from about 750 to about 4000 are useful in this invention. Mixtures of amine terminated polyethers may be used. In a preferred embodiment the amine terminated polyethers have an average molecular weight of at least 2,500. These materials may be made by various methods known in the art.

The amine terminated polyether resins, useful in this invention, for example, are polyether resins made from an appropriate initiator to which lower alkylene oxides such as ethylene oxide, propylene oxide, butylene oxide or mixtures thereof are added with the resulting hydroxyl terminated polyol then being aminated. When two or more oxides are used, they may be present as random mixtures or as blocks of one or the other polyether. In the amination step it is highly desirable that the terminal hydroxyl groups in the polyol be essentially all secondary hydroxyl groups for ease of amination. Normally, the amination step does not completely replace all of the hydroxyl groups. However, the majority of hydroxyl groups are replaced by amine groups. Therefore, the amine terminated polyether resins useful in this invention have greater than 50 per cent of their active hydrogens in the form of amine hydrogens. If ethylene oxide is used it is desirable to cap the hydroxyl terminated polyol with a small amount of higher alkylene oxide to ensure that the terminal hydroxyl groups are essentially all secondary hydroxyl groups. The polyols so prepared are then reductively aminated by prior art techniques, for example, as outlined in U.S. Pat. No. 3,654,370, incorporated herein by reference.

In the practice of this invention, a single high molecular weight amine terminated polyether resin may be used. Also, mixtures of high molecular weight amine terminated polyols such as mixtures of di- and trifunctional materials and/or different molecular weight or different chemical composition materials may be used.

The chain extenders useful in this invention include, for example, 1-methyl-3,5-diethyl-2,4-diaminobenzene, 1-methyl-3,5-diethyl-2,6-diaminobenzene (both of these materials are also called diethyltoluene diamine or DETDA), 1,3,5-triethyl-2,6-diaminobenzene, 3,5,3',5'-tetraethyl-4,4'-diaminodiphenylmethane and the like. Particularly preferred aromatic diamine chain extenders are 1-methyl-3,5-diethyl-2,4-diaminobenzene or a mixture of this compound with 1-methyl-3,5-diethyl-2,6-diaminobenzene. It is within the scope of this invention to include some aliphatic chain extender materials as described in U.S. Pat. Nos. 4,246,363 and 4,269,945.

Other chain extenders which find use in the method of this invention are low molecular weight polyoxyalkylene polyamines which contain terminal amine groups and are represented by the formula

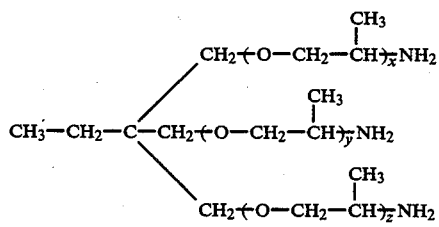

wherein $x+y+z$ has a value of about 5.3. The average amine hydrogen equivalent weight is about 67 and the product is commercially available from Texaco Chemical Company as Jeffamine® T-403. Another related polyoxypropylene polyamine is represented by the formula

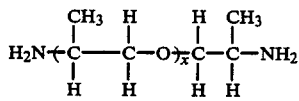

wherein x has a value of about 5.6. This product has an average amine hydrogen equivalent weight of about 100 and is commercially available from Texaco Chemical Company as Jeffamine D-400. The product having the same formula as above wherein x has an average value of about 2.6 is also useful. This product has an average amine hydrogen equivalent weight of about 57.5 and is commercially available from Texaco Chemical Company as Jeffamine D-230.

Other chain extenders will be apparent to those skilled in the art and the above recitation is not intended to be a limitation on the invention claimed herein.

A wide variety of aromatic polyisocyanates may be used here. Typical aromatic polyisocyanates include p-phenylene diisocyanate, polymethylene polyphenylisocyanate, 2,6-toluene diisocyanate, dianisidine diisocyanate, bitolylene diisocyanate, naphthalene-1,4-diisocyanate, bis(4-isocyanatophenyl)methane, bis(3-methyl-3-isocyanatophenyl)methane, bis(3-methyl-4-isocyanatophenyl)methane, and 4,4'-diphenylpropane diisocyanate.

Other aromatic polyisocyanates used in the practice of the invention are methylene-bridged polyphenyl polyisocyanate mixtures which have a functionality of from about 2 to about 4. These latter isocyanate compounds are generally produced by the phosgenation of corresponding methylene bridged polyphenyl polyamines, which are conventionally produced by the reaction of formaldehyde and primary aromatic amines, such as aniline, in the presence of hydrochloric acid and/or other acidic catalysts. Known processes for preparing polyamines and corresponding methylene-bridged polyphenyl polyisocyanates therefrom are described in the literature and in many patents, for example, U.S. Pat. Nos. 2,683,730; 2,950,263; 3,012,008; 3,344,162 and 3,362,979.

Usually methylene-bridged polyphenyl polyisocyanate mixtures contain about 20 to about 100 weight percent methylene diphenyldiisocyanate isomers, with the remainder being polymethylene polyphenyl diisocyanates having higher functionalities and higher molecular weights. Typical of these are polyphenyl polyisocyanate mixtures containing about 20 to 100 weight percent methylene diphenyldiisocyanate isomers, of which 20 to about 95 weight percent thereof is the 4,4'-isomer with the remainder being polymethylene polyphenyl polyisocyanates of higher molecular weight and functionality that have an average functionality of from about 2.1 to about 3.5. These isocyanate mixtures are known, commercially available materials and can be prepared by the process described in U.S. Pat. No. 3,362,979, issued Jan. 9, 1968 to Floyd E. Bentley.

By far the most preferred aromatic polyisocyanate is methylene bis(4-phenylisocyanate) or MDI. Pure MDI, quasi-prepolymers of MDI, modified pure MDI, etc. are useful. Materials of this type may be used to prepare suitable RIM elastomers. Since pure MDI is a solid and, thus, often inconvenient to use, liquid products based on MDI are often used and are included in the scope of the terms MDI or methylene bis(4-phenylisocyanate) used herein. U.S. Pat. No. 3,394,164 is an example of a liquid MDI product. More generally, uretonimine modified pure MDI is included also. This product is made by heating pure distilled MDI in the presence of a catalyst. The liquid product is a mixture of pure MDI and modified MDI:

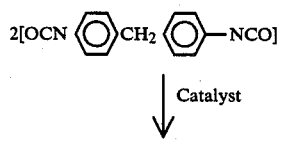

-continued

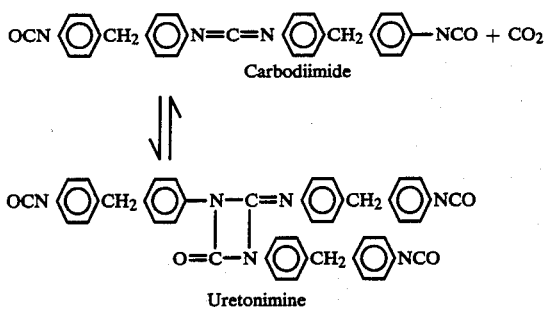

Examples of commercial materials of this type are Upjohn's Isonate® 125M (pure MDI) and ISONATE 143L ("liquid" MDI). Preferably the amount of isocyanates used is the stoichiometric amount based on all the ingredients in the formulation or greater than the stoichiometric amount.

Of course, the term polyisocyanate also includes quasi-prepolymers prepolymers of polyisocyanates with active hydrogen containing materials.

If needed, the following catalysts are useful although the reactants will normally not require a catalyst. Catalysts such as tertiary amines or an organic tin compound or other polyurethane catalysts are used. The organic tin compound may suitably be a stannous or stannic compound such as a stannous salt of a carboxylic acid, a trialkyltin oxide, a dialkyltin dihalide, a dialkyltin oxide, etc., wherein the organic groups of the organic portion of the tin compound are hydrocarbon groups containing from 1 to 8 carbon atoms. For example, dibutyltin dilaurate, di-butyltin diacetate, diethyltin diacetate, dihexyltin diacetate, di-2-ethylhexyltin oxide, dioctyltin dioxide, stannous octoate, stannous oleate, etc., or a mixture thereof, may be used.

Tertiary amine catalysts include trialkylamines (e.g., tri-methylamine, triethylamine); heterocyclic amines, such as N-alkylmorpholines (e.g., N-methylmorpholine, N-ethylmorpholine, di-methyldiaminodiethylether, etc.), 1,4-dimethylpiperazine, tri-ethylenediamine, etc.; and aliphatic polyamines such as N,N,N'N'-tetramethyl-1,3-butanediamine.

Other conventional formulation ingredients may be employed as needed such as; for example, foam stabilizers, also known as silicone oils or emulsifiers. The foam stabilizers may be an organic silane or siloxane. For example, compounds may be used having the formula:

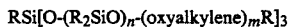

wherein R is an alkyl group containing from 1 to 4 carbon atoms; n is an integer of from 4 to 8; m is an integer of from 20 to 40; and the oxyalkylene groups are derived from propylene oxide and ethylene oxide. See, for example, U.S. Pat. No. 3,194,773. The materials coated by the process of this invention include, for example, strands of materials such as wire, glass, fibers, rods, etc.

By the method of this invention, it has been discovered that narrow strands such as electrical wires or other such materials may be coated with a spray technique rapidly and in multiple layers with each succeeding layer having a coating that can if desired separate the strands and hold them in place to form a solid elastomeric part comprising one layer or multiple layers of strands in any configuration. The process may be carried out, for example, with a two-component spray system wherein one component comprises the amine terminated polyether of greater than 1500 molecular weight having greater than 50% of their active hydrogens in the form of amine hydrogens and a chain extender, and the other component comprising an aromatic polyisocyanate which, of course, may be a quasi-prepolymer. When the two components are sprayed together as described in the examples to follow the reaction is so rapid that the resulting elastomer coating cures quickly and allows additional layers of strands or wires to be quickly placed over the first coated layer and the spray step repeated. By repeating this process as many times as desired, multiple spray layers of strands may be made into a one piece elastomeric part since each succeeding spray layer is bonded to the preceding one.

The process may more specifically be described as using spray application of a two-component polyurea elastomer to produce a flat cable with electrical wiring encapsulated in the polymer for use as a wiring harness. By using successive multiple spray passes, several courses of wiring can be rapidly encapsulated. The flat part which results would allow it to be surface mounted. Spray process is possible because the extremely active amine terminated polyethers cure quickly and allow successive spray applications to be made rapidly. In one embodiment of the envisioned process a roller would lay down one or more wires and a spray head following the wire roller would spray the wiring. The rapid cure immobilizes and fixes the wires in place. In the second and successive passes the additional courses of wiring would be encapsulated until the proper number of circuits were complete. The thickness of each coating and thickness of the finished part would depend on the amount of spray applied on each pass and the number of layers in the final part. Each pass could represent, for example, about 4–6 mil thickness, and the finished part could be about 0.3 to 0.5" thick. Previously insulated wires may be used, or if desired uninsulated wires may be used. The cured elastomer will provide the insulation needed if the uninsulated wires are not in contact with each other when being sprayed.

The following examples illustrate this invention.

EXAMPLE 1

This example used a system with the A-component, a quasi-prepolymer of Isonate® 143L, 45 parts; and Jeffox® PPG-4000, 55 parts; and the B-component, a blend of Jeffamine® T-5000 (amine terminated polyoxyalkylene triol), 77 parts; diethyltoluene diamine (chain extender) 23 parts. The components were mixed 1:1 by volume and fused to coat four to six staggered sets of wires. An initial pass was sprayed down with a length of electrical wire being laid on top of the elastomer followed by a thin coat of the spray polyurea elastomer to hold the wire in place. A second length of wire was laid next to the first, again followed by a coat of the elastomer. This was repeated several times followed by a last thicker pass to complete the encapsulation. This system worked well with the final wire harness being very tough but a little firmer than expected.

EXAMPLE 2

In another example a quasi-prepolymer A-component, Isonate 143L, 39 parts; Jeffox PPG-4000, 61 parts; and a B-component, Jeffamine D-4000 (amine terminated polyoxyalkylene diol) 85 parts; diethyltoluene diamine, 19.4 parts, was used. This system was processed like Example 1. This system worked well giving a very flexible elastomer but not as tough as Example 1.

EXAMPLE 3

In another example, a quasi-prepolymer A-component Isonate 143L, 18.9 parts; Jeffox PPG-4000, 26.1 parts; and a B-component, Jeffamine D-4000, 16.73 parts; Jeffamine T-5000, 18.85 parts diethyltoluene diamine, 9.42 parts, was used. This system was processed as in Example 1. This system worked well giving a very tough and flexible polyurea elastomer.

All spray work was done using a Gusmer HV proportioner with a model GX7 gun. The systems were sprayed using a block temperature of 165° F. on the A-component and 160° F. on the B-component with a hose temperature of 160° F. The system output was set at 15 lb/min with a line pressure of 2500 psig to 3000 psig. These systems were mixed 1:1 by volume in the equipment.

GLOSSARY

Isonate ® 143L—Aromatic isocyanate having an equivalent weight of 143 meq/g. Product of Dow Chemical.

Jeffox ® PPG-4000—A 4000 molecular weight polyether polyol comprised of polypropylene glycol. A product of Texaco Chemical Co.

Jeffamine ® D-4000—A 4000 molecular weight amine terminated polyoxyalkylene diol. A product of Texaco Chemical Co.

Jeffamine ® T-5000—A 5000 molecular weight amine terminated polyoxyalkylene triol. A product of Texaco Chemical Co.

Detda—Diethyltoluene diamine chain extender. A product of Ethyl Corp.

We claim:

1. A method for coating wires which comprises spraying onto a first set of wires a formulation comprising amine-terminated polyethers of greater than 1500 molecular weight having greater than 50% of their active hydrogens in the form of amine hydrogens prepared by the reductive amination of polyols, a chain extender and an aromatic polyisocyanate.

2. A method as in claim 1 wherein additional wires are placed in proximity to the first set of wires after the spray step and an additional spray step is performed.

3. A method as in claim 1 wherein additional wires are layered over the preceding sprayed first set of wires thus forming multiple layers of wires coated with the reacted components of the spray.

* * * * *